United States Patent [19]

Spence

[11] Patent Number: 5,060,013
[45] Date of Patent: Oct. 22, 1991

[54] HARDCOPY OUTPUT DEVICE WITH TEST PATCH LOCATION SEQUENCER

[75] Inventor: John P. Spence, Webster, N.Y.

[73] Assignee: Eastman Kodak Company, Rochester, N.Y.

[21] Appl. No.: 561,043

[22] Filed: Jul. 31, 1990

[51] Int. Cl.$^5$ ............................................ G03G 21/00
[52] U.S. Cl. ..................................................... 355/208
[58] Field of Search ...................... 355/208, 204, 203; 358/474, 493, 448, 455

[56] References Cited

U.S. PATENT DOCUMENTS

| | | | |
|---|---|---|---|
| 4,003,654 | 11/1977 | Smolen | 355/125 |
| 4,348,099 | 9/1982 | Fantozzi | 355/14 E |
| 4,519,695 | 5/1985 | Murai et al. | 355/208 |
| 4,618,248 | 10/1986 | Buchar | 355/235 |
| 4,693,592 | 9/1987 | Kurpan | 355/208 |
| 4,774,548 | 9/1988 | Beaulieu et al. | 355/38 |
| 4,894,685 | 1/1990 | Shoji | 355/246 |

FOREIGN PATENT DOCUMENTS 1559341  1/1980  United Kingdom ................ 355/246

Primary Examiner—Benjamin R. Fuller
Assistant Examiner—Nancy Le
Attorney, Agent, or Firm—J. Gary Mohr

[57] ABSTRACT

Electrophotographic process control in copiers and printers using test patches at different locations within the image frame. Test patches or areas are placed at various locations in subsequent frames to reduce any memory discontinuities encountered when high density areas are repeatedly placed at the same location within an image frame. The overall image frame includes a plurality of image or picture areas which contain unrelated information data and at least one these areas is replaced with a process test area in some or all of the subsequently produced frames. The test area includes several test strips of varying density which may also be positioned differently within the test area in subsequent frames. The variation in location of the test areas and the position of the test strips can be by random selection or by a predetermined pattern which places the areas and strips at several possible locations. The locations are communicated to the process controller so that appropriate sensors can properly monitor and measure the test patches.

15 Claims, 3 Drawing Sheets

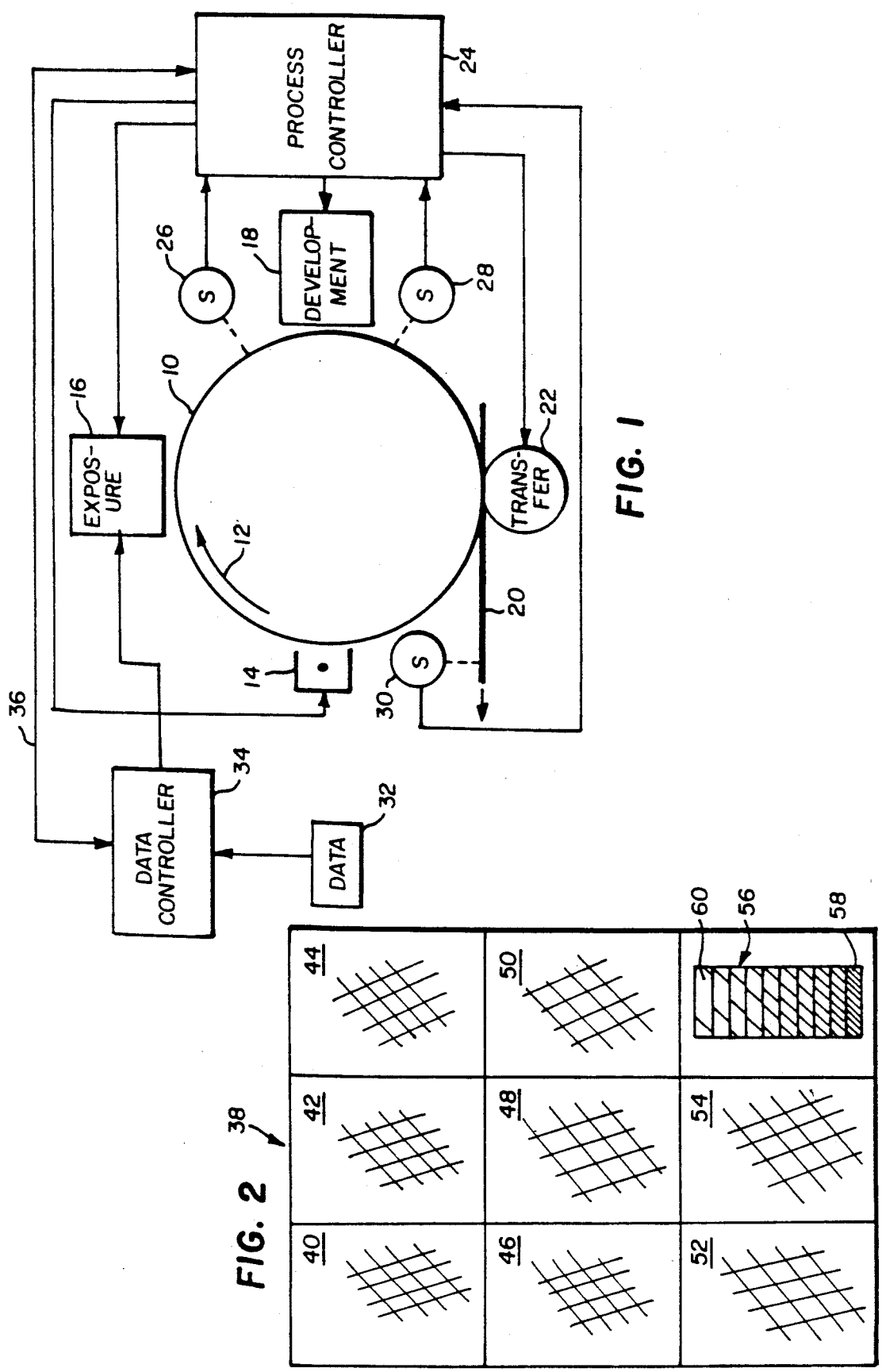

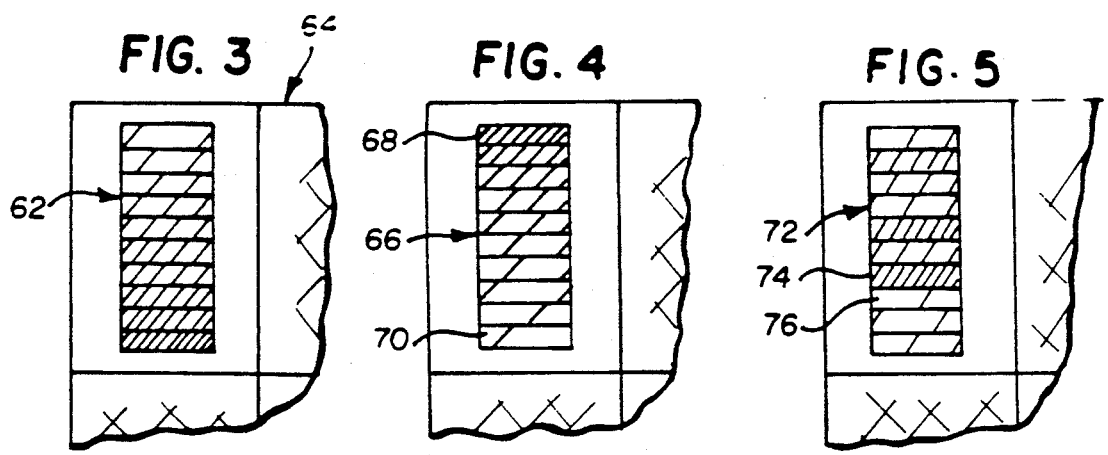
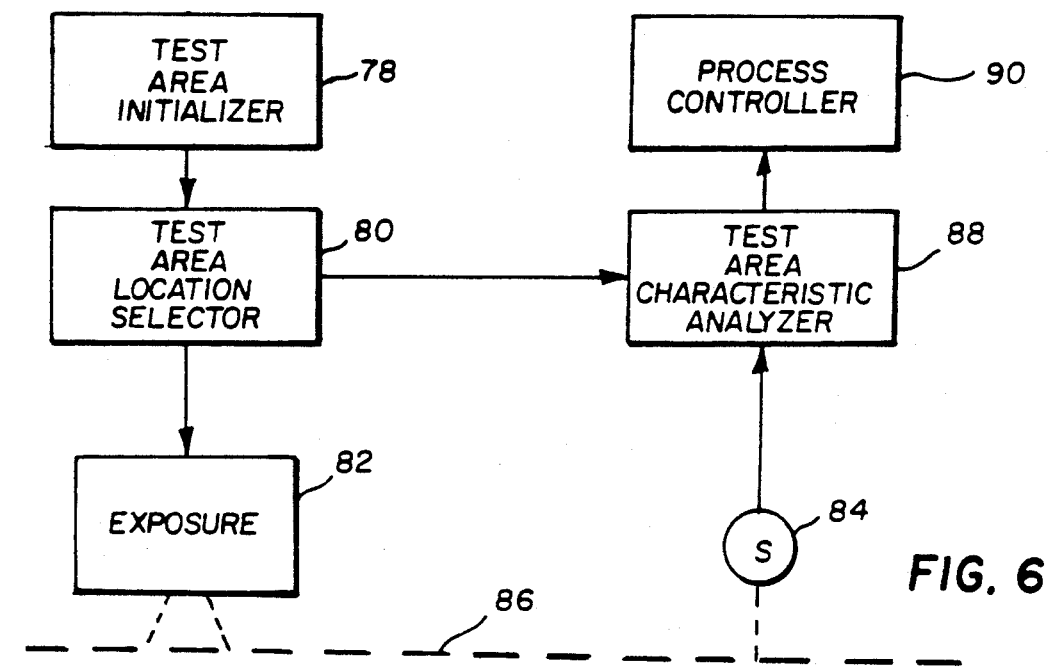
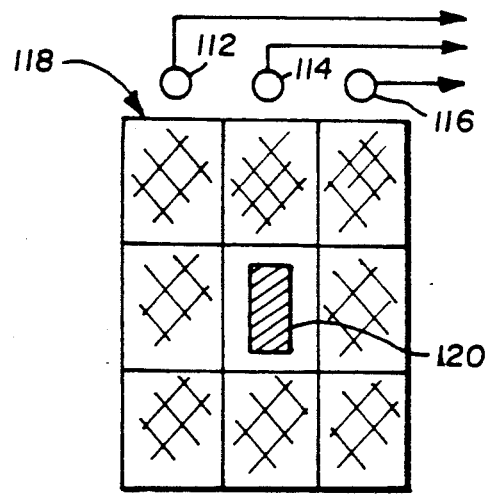

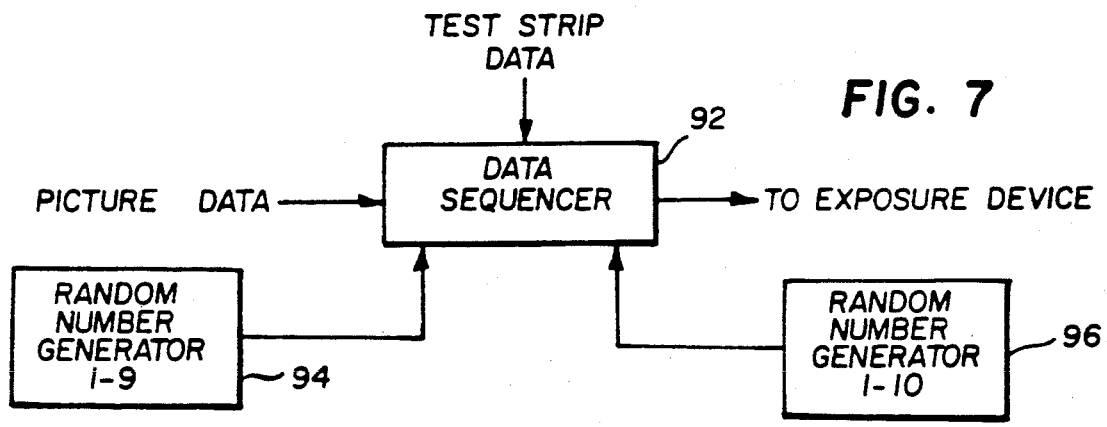
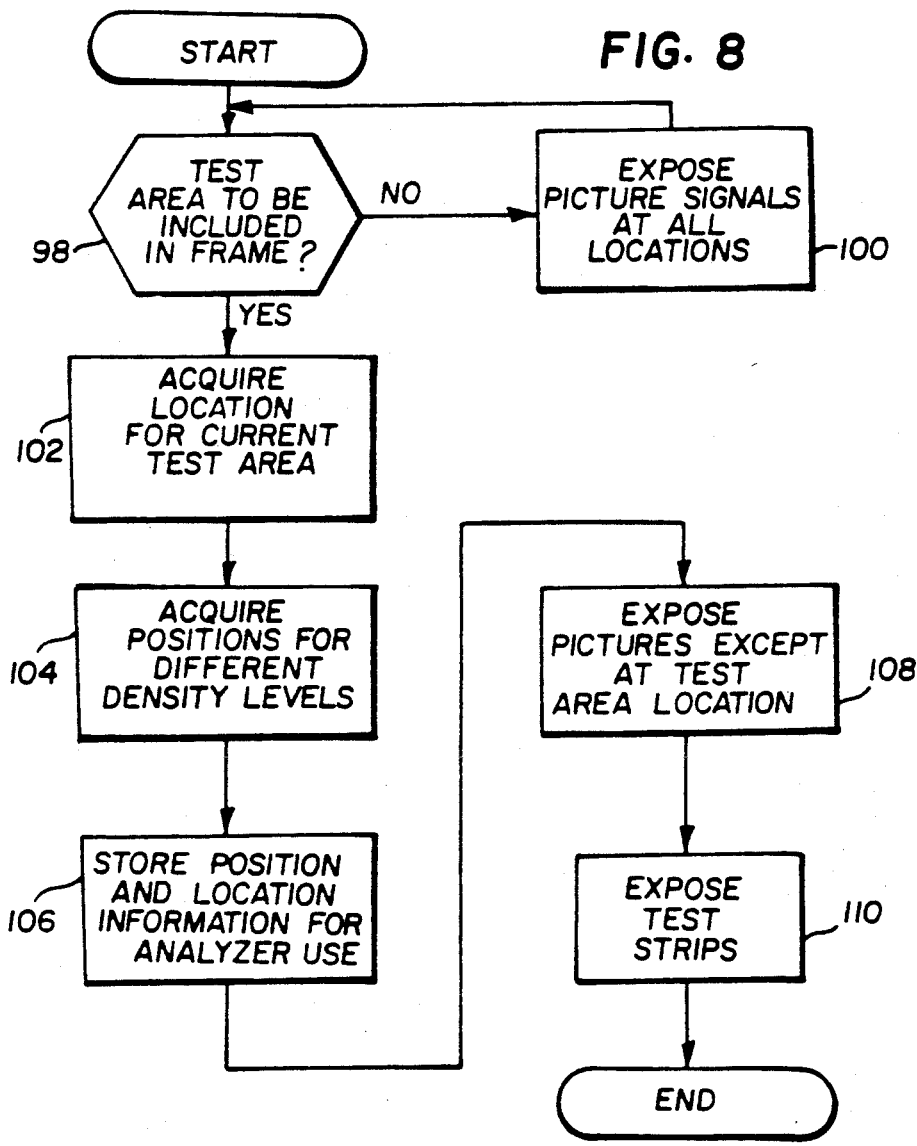

HARDCOPY OUTPUT DEVICE WITH TEST PATCH LOCATION SEQUENCER

BACKGROUND OF THE INVENTION

1. Field of the Invention

This invention relates, in general, to photocopying and, more specifically, to hardcopy output devices which utilize process control responsive to test patch measurements.

2. Description of the Prior Art

Photocopiers, electrophotographic printers, and like devices, all need the ability to maintain proper control over the image-producing apparatus to insure high quality, hardcopy outputs. One means for controlling a variety of parameters within the apparatus is by using a test area or process control patch positioned on the photosensitive or charge-retaining member of the apparatus. The test area is traditionally a small area located on the photosensitive member outside the region or frame allocated for the normal image information which will be transferred to a hardcopy output medium, such as a sheet of paper. U.S. Pat. No. 4,949,105 (Ser. No. 394,443) illustrates such a conventional patch or test area. In some cases, the test area is developed by toner and reflected light from the developed patch gives an indication of the density of the developed image and allows for changes in the operating parameters to improve the image quality. The toner concentration, the charge on the photosensitive member, the bias applied to the transfer station, and the amount of exposure from the printhead or exposing device are parameters which can be changed according to the information received from the circuitry which looks at the amount of light reflected from the test area. In other cases, the test area is sensed before development to determine what, if any, process changes need to be made.

The test patch or area is usually located outside the frame area which will be used for imaging and developing the data information for transfer to the hardcopy output sheet. However, this type of test patch placement removes the patch from the actual area where the process needs to be monitored, thus adding a possible degree of error in the monitoring and controlling process. Placing the test patch within the frame area to eliminate this possible error necessarily requires an extra frame which is not used for image information, a frame with a portion thereof dedicated to the test patch, and/or multiple-frame memory problems which can occur when the same information is imaged at the same location for several frames. The latter problem is usually caused by the memory characteristics of the photosensitive member when the same image is frequently exposed at the same location on the member.

For these reasons, a very accurate and efficient test patch has not been provided according to the prior art. Therefore, it is desirable, and an object of this invention, to provide an accurate and efficient system for maintaining the performance of hardcopy devices which can produce output sheets having several unrelated and separate images formed in a frame area and transferred to an output sheet.

SUMMARY OF THE INVENTION

There is disclosed herein a new and useful process control monitoring system for electrostatographic copiers, printers, and like devices. The system uses process control test or density patches which are moved around to various locations to reduce or eliminate any process memory problems normally associated with test patches or areas always positioned at the same location. The test areas are located directly in place of image areas within the image frame. According to a specific embodiment of the invention, a sequencing circuit or control algorithm is used to vary the test area throughout the image frame in subsequently produced frames. In addition, the test area includes individual test strips of different densities which are also varied to make the subsequent test areas dissimilar. Variation in location and position is accomplished by random selection. According to another embodiment, the location and position are governed by a predetermined pattern of distribution which controls the placements in different frames. With both forms of distribution, the test areas eventually occupy some or all of the available locations within the frame.

Sensors are used to detect and measure the characteristics of, or produced by, the test areas. Electrometers are used when the latent image of the test area is examined and densitometers are used when a toned image is examined, either before or after transfer to the hardcopy output sheet. The sensors are arranged to sample the test areas in a defined column of the frame, or page output directly corresponding to the frame. The particular area within the column which travels by the sensor is gated or processed to obtain the measurements needed from the exact test area location. The exact location of test area placement is relayed to the monitoring device so that the measurements can be coordinated with the location of the test area. By using these arrangements for test areas or patches in a device producing several unrelated images within a single frame, precise process control without memory problems or a completely unproductive frame can be obtained.

BRIEF DESCRIPTION OF THE DRAWINGS

Further advantages and uses of this invention will become more apparent when considered in view of the following detailed description and drawings, in which:

FIG. 1 is a schematic view showing the pertinent portions of an electrostatographic device configured to use the invention;

FIG. 2 illustrates one frame of image and test data;

FIG. 3 is a partial view of a frame with test data at a different location;

FIG. 4 is a partial view of a frame with the test data specifically arranged opposite to that shown in FIG. 3;

FIG. 5 is a partial view of a frame with the test data arranged in a random fashion;

FIG. 6 is a block diagram of apparatus used to coordinate test area locations between exposing and analyzing operations;

FIG. 7 is a block diagram of the data sequencing apparatus;

FIG. 8 is a flow chart illustrating the functions performed by the apparatus described in a specific embodiment of the invention; and FIG 9 is a diagram showing sensor placement for measuring test areas at various locations.

DESCRIPTION OF THE PREFERRED EMBODIMENTS

Throughout the following description, similar reference characters refer to similar elements or members in all of the figures of the drawings.

Referring now to the drawings, and to FIG. 1 in particular, there is shown an electrostatographic device of the type which can use the teachings of this invention. The device includes the photosensitive member or drum 10 which rotates in direction 12. The corona charger 14 applies a charger to the surface of the drum 10 which is selectively discharged by the exposure device 16 to produce the desired latent image on the drum 10. The exposure device 16 can be a conventional optical system with suitable masking and subexposure capabilities to place a test area on the drum 10 at specific locations. The exposure device 16 may also consist of a scanned laser beam which is appropriately modulated to form the latent image or the exposure device 16 may be an array printhead using a plurality of discrete light-emitting elements which can be selectively activated to write or expose the latent image on the photosensitive drum 10. Whatever the type of exposure device used, it must be capable of placing image content and test data content on the photosensitive drum 10 at various locations.

The latent image on the drum 10 is developed by toner at the development station 18 and the developed image is transferred to the hardcopy output medium, such as the sheet 20, with the aid of the transfer roller 22. Other necessary operations for such devices have been eliminated from FIG. 1 in the interest of clarity, such as the fusing station which would normally be used to fuse the toner image to the sheet 20. Other types of devices may be used with the location sequencer of this invention, such as devices which use intermediate transfer of the developed image, and devices which use several developed images in different colors to form a composite color image on the output sheet.

In this embodiment of the invention, the process controller 24 coordinates and controls the various functions and monitoring devices used in the apparatus. For example, the process controller 24 is used to control the exposure device 16, the development station 18, and the operation of the transfer roller 22. These controls may affect the degree by which these stations and devices operate upon the photosensitive member 10. For example, the intensity of the exposure of device 16 may be controlled by the process controller 24, the intensity or density of the toner mixture at development station 18 may be controlled, and the bias voltage necessary to effect a transfer at the transfer roller 22 may be under the control of the process controller 24. The sensors 26, 28 and 30 monitor or measure various parameters or characteristics of the device and feed the signals to the process controller 24. For example, the sensor 26 could be an electrometer which measures the charge contained in the latent image produced by the exposure device 16. The sensor 28 could be an electrometer which also measures the charge of the latent image after passing the development station 18 when it is desired to not develop the latent image in order to make another measurement of the latent image charger at this position. As an alternative, and perhaps the more normal case, the sensor 28 may be a densitometer which looks at a toned or developed image after the development station 18 to determine the density or gray-level of the developed image while it is still on the photosensitive member 10. The sensor 30 can be a densitometer which looks at the toned image after it is transferred to the sheet 20. However and wherever the image created by the exposure device 16 is monitored by the sensors, it is significant to this invention that they are capable of measuring exposed test areas at various locations on the photosensitive member 10 and/or the output sheet 20.

The input data 32 consists of the image or intelligence information which is to be exposed, written, or placed upon the photosensitive member 10, and the test data or test area information which is also to be exposed, placed, or written onto the member 10 at specific locations. The data controller 34, which communicates with the process controller 24, is used to transfer the data 32 to the exposure device 16 in such a fashion that the test area placed upon the photosensitive member 10 is at a desired location. This location is made known to the process controller 24 through the communication channel 36 so that the correct information is received from the sensors 26, 28 or 30. It is emphasized that not all of the sensors may be needed for proper process control of the device. In some instances, only one or two of the sensors may be necessary to maintain precise control of the process variables.

FIG. 2 illustrates one frame of image and test data which is exposed, written, or placed upon the photosensitive member. The frame 38 is used herein to signify the area or region where one complete operation of exposure, development, and transfer takes place in the associated device. For example, the frame 38 may be a designated area on the photosensitive member in which image and test information will be placed for development and transfer to the output sheet. On the other hand, the frame 38 also corresponds to the content placed upon the output sheet 20 and, in cases where the sensor 30, shown in FIG. 1, is used to monitor the test areas, the frame 38 corresponds to the data placed upon the output sheet. Although some devices use the same frame on the photosensitive member 10 for each and every frame produced, it is also within the contemplation of the invention that different areas or regions on the photosensitive member 10 may be used for subsequent frames of image and test data information.

The frame 38 shown in FIG. 2 includes a plurality of image areas such as areas 40, 42, 44, 46, 48, 50, 52 and 54, which may contain image data or information which is completely unrelated or unconnected to each other. For example, image area 42 may be a picture of one object and image area 44 may be a picture of another object. Thus, there are eight image areas contained in the frame 38 which may be completely unrelated to each other, not necessarily in content, but in continuity of the image areas to adjacent image areas within the frame 38. In other words, there are no lines or characters existing in image area 42 which extend over and align with the image area 44. This type of frame would be created, for example, when eight separate 4"×6" photographic images are produced on the same 12"×18" sheet of output paper.

The frame 38 also contains the test area 56 which is included in one of the areas for monitoring the system performance for process control. In other words, the test area 56 is monitored or measured by the sensors 26, 28, and/or 30, shown in FIG. to determine what, if anything, must be changed in the process to improve the quality of the output sheet. The test area 56, in this specific embodiment, is illustrated in the lower right hand corner of the frame area 38. It replaces image data which would normally be contained within this region. Therefore, one image area is sacrificed so that the test area 56 can be produced during this particular frame. On subsequent frames, the test area is moved around to different locations within the frame so that the test area is not located at the same position in all frames. This reduces or eliminates the memory problems associated with having a high contrast test area located continuously at the same place within the frame. It is emphasized that the test area does not have to be used in every sequential frame, but may be used every several frames, depending upon the degree of control necessary.

As shown in FIG. 2, the test area 56 includes a plurality of test strips of different density levels arranged in a descending order of density, that is, the densest strip 58 is located at the bottom of the test area 56, and the least dense strip 60 is located at the top. This gives a wide variety of density levels which can be checked by the sensor and processed by the process controller 24 to determine the appropriate device process changes which may be needed. The actual rendering of the test strips can be either by gray-level exposure or binary halftoning to produce an effective density of varying degrees throughout the test area 56, depending upon the type of exposure system used in the device.

In order for the process controller to acquire information on as much of frame 38 as possible, the test area 56 is moved to other locations in subsequent frames. For example, as shown in FIG. 3, the test area 62 is located in the upper left hand corner of the frame 64, which is assumed to be produced later than frame 38. The distribution of the test strips within the test area 62 are similar to those shown for test area 56 of FIG. 2.

The movement of the test area across the various image areas of the frame greatly reduces the memory effect of the apparatus which can occur when a test patch is placed at a particular location every time. In addition to moving the test area, it is also possible to change the orientation of the test strips within the test area to additionally reduce any memory effects produced in the same image area by the test area. For example, as shown in FIG. 4, the test area 66 includes test strips which are oppositely distributed with respect to the test strips comprising the test area 62 shown in FIG. 3. In other words, the test strip 68, shown in FIG. 4, is the most dense strip and is located at the top of the test area 66. Also, the test strip 70 is the least dense test strip and is located at the bottom of the test area 66. This distribution is just opposite to that of the test strips shown in the test area 62 of FIG. 3. Therefore, not only can the test areas be moved around to different locations within the frame 38, the individual test strips of different densities within the test area can be alternated or changed so that memory effects within the test area itself are minimized.

FIG. 5 shows an arrangement wherein the test strips within the test area 72 do not have any definite order or progression from the lowest to the highest density levels. For example, test strip 74 is the most dense strip and the adjacent strip 76 is the least dense strip. Arrangement of the strips within the test area 72 can be by random arrangement or by a predetermined pattern. Whatever the process used to determine the location of the specific strips, this arrangement also minimizes any memory characteristic of the device for the strips within the test areas.

FIG. 6 is a block diagram of apparatus used to coordinate test area locations between exposing and analyzing apparatus. In other words, not only must the test area be specifically placed at a location within the frame, but this specific location must be known to the analyzing or sensing portion of the apparatus so that the correct region of the frame is monitored for process control.

According to FIG. 6, the test area initializer 78 first indicates that a test area is to be included in the particular frame being exposed. The test area selector 80 next determines the location within the current frame where the test area will be placed or exposed by the exposure device 82. The sensor 84 monitors or measures the areas from the photosensitive member or the output sheet, which are represented by the dashed line 86. The test area characteristic analyzer 88 receives the output of the sensor 84 and, from the information from the location selector 80, determines what information corresponds to the exact location of the test area. This information is analyzed and transferred to the process controller 90, which is comparable to the process controller 24 shown in FIG. 1.

FIG. 7 is a block diagram of data sequencing apparatus which may be used to determine the location of image and test data within a frame. The data sequencer 92 shown in FIG. 7 substantially performs the functions of the data controller 34 shown in FIG. 1. The picture or image data and the test strip data are applied to the data sequencer 92 which eventually transfers this data, in the appropriate sequence, to the exposure device. The sequence is determined by the random number generators 94 and 96, according to this specific embodiment. Random number generator 94 is used to determine the position or location of the test area on the frame in one of the nine areas normally usable for image data. When one of the nine areas is selected, the image data is not placed in this area and the test strip data is placed in this area to form the test area. The random number generator 96 is used to control the sequencer for selecting various locations of the test strips within the test area. There are ten test strips shown in the test areas thus far discussed herein, and although more than ten patterns may be used, this particular embodiment is capable of having ten different patterns associated with the strip placements within the test area. It is emphasized that other numbers of test strips than ten may be used within the contemplation of the invention. Also, more or less than nine areas in the frame may be used for the placement of test and image data.

By using random selection for the areas and strips, all possibilities will eventually be used after several frames. In some cases, it may not be desirable to change the placement of the test areas and strips according to a random pattern. Such changes can be made by a more controlled and known sequence of patterns. For example, as shown in FIG. 2, the test area 56 on the next frame may be at area 50, and on the next frame may be at area 44, and on the next frame at area 42, and so on until all of the areas have been occupied. A similar predetermined pattern may also be used for the strips within the test areas. The predetermined patterns may be cyclic or pseudorandom.

FIG. 8 is a flow chart illustrating the functions performed by the apparatus described in this specific embodiment of the invention and is symbolic of an algorithm which may be used by a microprocessor controlling the overall operation of the device. According to block 98, a determination is first made whether a test strip is to be included in the frame being exposed. If no test area is to be included, process control is diverted to block 100 which causes the image or picture signals to be exposed or placed at all of the areas within the frame. Flow then reverts back to block 98 and continues in this loop until a frame occurs in which a test area is to be exposed. When this occurs, process flow continues or is directed to block 102 which obtains the location for the current test area. According to block 104, information is acquired about the positions of the different density levels, or test strips, within the test area. The information for blocks 102 and 104, as previously discussed, can be based upon a random selection, a predetermined pattern selection, or other means which move the areas and strips within their respective locations to prevent memory problems in the device. Once the locations and positions are determined, these are stored, according to block 106, for use in the analyzing portion of the device. Then, as indicated in blocks 108 and 110, the picture or image information is exposed everywhere except at the test area location, which is exposed with the test strips.

FIG. 9 is a diagram showing sensor placement for measuring test areas at various locations. Sensors 112, 114 and 116 are positioned to scan or measure three different columns in the frame 118. For example, if the frame 118 is a finished output sheet, the sensors 112, 114 and 116 correspond to the sensor 30 shown in FIG. 1. They measure a reflected density of the toner transferred to the output sheet and contained within the frame area 118. In this specific embodiment, the test area 120 is located in the middle of the frame 118 and would be sensed by the sensor 114 as the sheet or frame 118 is moved underneath the three sensors. Sensors 112 and 116, although outputting measurements, would not be selected by the apparatus to produce the measured data. That would be provided by sensor 114 with a timing such that the data observed from sensor 114 would occur when the test area 120 is underneath the sensor 114. It is emphasized that, in some applications, test areas may not be used at every location within the frame. For example, only one column may be used for the test areas and, in such instances, only one of the sensors 112, 114 and 116, may be required.

By using the teachings of this invention, devices which produce unrelated image areas in the same frame can be accurately and efficiently monitored by moving the test area or test patch throughout different areas in subsequent frames.

It is emphasized that numerous changes may be made in the above-described system without departing from the teachings of the invention. It is intended that all of the matter contained in the foregoing description, or shown in the accompanying drawings, shall be interpreted as illustrative rather than limiting.

I claim as my invention:

1. A system for monitoring the performance of an electrostatographic machine which includes a photosensitive surface, an exposure device for exposing selected areas of the photosensitive member, and a developing device for applying toner to a exposed photosensitive member, said system comprising:
   means for randomly requesting of a test area which has not been tested in a portion of a frame on the photosensitive member;
   means for controlling a location of the test area in the frame so that subsequently exposed test areas are at different locations in the frame;
   means for measuring a characteristic of, or produced by, the test area; and
   means for informing the measuring means about the location of the test area.

2. The monitoring system of claim 1 wherein the location controlling means includes means for sequencing the location of the test area throughout the entire frame before repeating a test area location within the frame.

3. The monitoring system of claim 1 wherein the test area comprises a plurality of test strips, with each strip having a different density.

4. The monitoring system of claim 3 further including means for controlling a position of the test strips within test area so that subsequently exposed test areas at same location in frame do not have all the same gray-levels at the same position within the test area.

5. The monitoring system of claim 1 wherein the characteristic measuring means is directly responsive to a charge on the photosensitive member.

6. The monitoring system of claim 1 wherein the characteristic measuring means is directly responsive to light reflected from a toned area on an output sheet.

7. The monitoring system of claim 1 wherein the characteristic measuring means is directly responsive to light reflected from a toned area on the photosensitive member.

8. The monitoring system of claim wherein the test area is located within the frame at a position where, in a subsequent frame, an image will be placed.

9. A system for monitoring the performance of an electrostatographic machine which includes a photosensitive surface, an exposure device for exposing selected area of a photosensitive member, and a developing device for applying toner to the exposed photosensitive member, said system comprising:
   means for randomly a test area which has not been tested a portion of a frame on the photosensitive member;
   means for controlling and randomly selecting the location of the test area in the frame so that subsequently exposed test areas are at different locations within the frame;
   means for measuring a characteristic of, or produced by, the test area; and
   means for informing the measuring means about the location of the test area.

10. A system for monitoring a performance of an electrostatographic machine which includes a photosensitive surface, an exposure device for exposing selected area of a photosensitive member, and a developing device for applying toner to the exposed photosensitive member, said system comprising:
    means for randomly requesting a test area which has not been tested in a portion of a frame on the photosensitive member;
    means for controlling a location of the test area in the frame so that subsequently exposed test areas are at different locations in the frame which includes a plurality of image areas which are contained within boundaries of the frame and are suitable for exposing image information thereon, and wherein the test area is included within one of said image areas instead of image information;
    means for measuring a characteristic of, or produced by, the test area; and
    means for informing the measuring means about the location of the test area.

11. A system for monitoring the performance of an electrostatographic machine which includes a photosensitive surface, an exposure device for writing data onto the photosensitive member, and a developing device for applying toner to the exposed photosensitive member, said system comprising:

a designated frame area on the photosensitive member, said frame area including a plurality of image areas which are contained within the boundaries of the frame area for exposing unconnected image information thereon;

means for affecting the exposure of a test area in one of the image areas in the frame instead of image information, said test area including a plurality of test strips, with each test strip exposed at a different effective exposure level to produce a toned image having different densities for each strip;

means for controlling a position of the test strips within the test area so that successively exposed test areas at same location in the frame do not have all same densities at same position within a test area;

means for controlling a location of the test area in a frame so that all of the image areas in the frame are eventually used as a test area;

means for measuring an effective density of a test strip produced on a toned output sheet; and means for denoting the location of the test area and informing measuring means about the location of the test area.

12. A method of monitoring the performance of an electrostatographic machine having a photosensitive member, said method including the steps of:

exposing a frame area on the photosensitive member with image and test data, said image data being confined to a plurality of image areas in the frame, and said test data, instead of being confined to a test area located at one of the image areas within the frame area;

changing the location of the test area within the frame area on subsequently exposed frames so that a plurality of the image areas in the frame are eventually used as a test area;

measuring a characteristic of, or produced by, the exposed test area in the frame; and coordinating the location of the test area with a device used to make the characteristic measurement so that the measurement is made at a location corresponding to the test area.

13. The performance monitoring method of claim 12 wherein the location of the test area is changed according to a predetermined pattern.

14. The performance monitoring method of claim 12 wherein the test area comprises a plurality of test strips, with each strip exposed at a different effective exposure level to produce a toned image having different densities for each strip.

15. The performance monitoring method of claim 14 including the step of controlling a position of the test strips within the test area so that subsequently exposed test areas at the same location in the frame do not have all same densities at the same position within the test area.

* * * * *